United States Patent [19]

Bischoff et al.

[11] Patent Number: 5,011,234
[45] Date of Patent: Apr. 30, 1991

[54] ARRANGEMENT FOR MOUNTING A BRAKE POWER BOOSTER

[75] Inventors: Gilbert Bischoff, Hattersheim; Karl Breitwieser, Reinheim; Eckhard Emmel, Hungen, all of Fed. Rep. of Germany

[73] Assignee: Alfred Teves GmbH, Frankfurt Am Main, Fed. Rep. of Germany

[21] Appl. No.: 367,409

[22] Filed: Jun. 16, 1989

[30] Foreign Application Priority Data

Jul. 4, 1988 [DE] Fed. Rep. of Germany ....... 3822554

[51] Int. Cl.$^5$ .............................................. B60T 13/52
[52] U.S. Cl. ...................................... 303/4; 188/357; 91/369.1
[58] Field of Search ............................. 303/114, 4, 12; 60/547.1; 91/369.1; 92/128, 61, 169.4; 188/356, 357

[56] References Cited

U.S. PATENT DOCUMENTS

| | | | |
|---|---|---|---|
| 3,175,235 | 3/1965 | Randol | 92/161 |
| 4,446,699 | 5/1984 | Fujii | 92/169.4 X |
| 4,594,854 | 6/1986 | Takeuchi et al. | 92/129 X |
| 4,725,029 | 2/1988 | Herve | 403/348 X |
| 4,826,121 | 5/1989 | Rossigno et al. | 60/547.1 X |

FOREIGN PATENT DOCUMENTS 2040376 8/1980 United Kingdom ............... 92/169.4

Primary Examiner—Matthew C. Graham
Attorney, Agent, or Firm—Robert P. Seitter; J. Gordon Lewis

[57] ABSTRACT

An arrangement for mounting a brake power booster to a splash-board of a motor vehicle is proposed, which brake power booster is actuatable by means of an operating rod and is provided in a booster housing with at least a first evacuatable and a ventilatable second working chamber, the splash-board separating the motor vehicle's passenger compartment from a mounting compartment of the brake power booster, preferably the engine compartment. In order to eliminate the engine noises and the intake noises of the brake power booster, which have a disturbing effect, to a large extent by simultaneously sealing the passenger compartment, the present invention provides that the aeration of the second working chamber is effected via an aeration compartment communicating with the mounting compartment, said aeration compartment being confined by means of a protecting sleeve surrounding the booster housing and/or a control valve housing in part, said protecting sleeve being sealed both relative to the splash-board and relative to the operating rod.

13 Claims, 2 Drawing Sheets

ARRANGEMENT FOR MOUNTING A BRAKE POWER BOOSTER

BACKGROUND OF THE INVENTION

The present invention relates to an arrangement for mounting a brake power booster to a splash-board of a motor vehicle, which brake power booster is actuatable by means of an operating rod and is provided in a booster housing with at least an evacuatable first and a ventilatable second working chamber, the splash-board separating the motor vehicle's passenger compartment from a mounting compartment of the brake power booster, preferably the engine compartment.

For years it has been the state of the art to mount brake power boosters to the splash-board of motor vehicles by means of mounting elements extending through the splash-board and being provided with a thread so that nuts can be screwed on.

Another mounting arrangement is known from the German printed and published patent application DE-OS No. 36 29 181. With the mounting arrangement described therein, the brake power booster housing is provided with at least two shaped nuts which are put through corresponding passages formed in the splash-board of a motor vehicle, the brake power booster then being brought by means of a rotary motion and/or a linear displacement in a secure position in which it is detachably locked. Herein, elastic means, preferably in the form of a spring washer mounted to the nuts, are provided between the brake power booster and the fire wall, said spring washer elastically pre-loading the brake power booster in opposition to the fire wall or a mounting clamp attached thereto.

In order to be able to lock the brake power booster in its secure position in a detachable manner, the spring washer is provided with a finger jutting out, on said finger's end a lip or nose being formed which latter snaps in a notch provided in the fire wall.

With the known mounting arrangements, however, the effect of sonorous vibrations caused, on the one hand, by the engine and being generated, on the other hand, during the aeration of the brake power booster is considered disadvantageous, said sonorous vibrations entering the passenger compartment through the opening provided in the splash-board for the mounting of the brake power booster and there being regarded as disturbing noises by the passengers of the motor vehicle.

Another disadvantage may also consist in that splashing water may penetrate into the passenger compartment through the intermediary of the above-mentioned mounting opening.

SUMMARY OF THE INVENTION

It is, therefore, the object of the present invention to improve an arrangement for mounting a brake power booster of the type initially referred to such that the engine noises and the intake noises of the brake power booster, which noises have a disturbing effect, will be eliminated to a large extent by simultaneously sealing the passenger compartment.

According to the invention, this object will be achieved in that the aeration of the second working chamber is effected via an aeration compartment communicating with the mounting compartment, said aeration compartment being confined by means of a protecting sleeve surrounding the booster housing and/or a control valve housing in part, said protecting sleeve being sealed both relative to the splash-board and relative to the operating rod.

This measure permits the replacement of highly compressed filter elements used so far, which had been provided in the control housing of the brake power booster for silencing purposes, by simple filter elements which only serve the filtering of dust. By this means, the response times of the brake power booster will be reduced considerably. The filter elements can be arranged preferably between that part of the booster housing projecting into the interior of the protecting sleeve and the inner wall of the protecting sleeve.

A particularly advantageous embodiment of the subject-matter of the invention provides that the protecting sleeve is mounted to an adapter arranged between the booster housing and the splash-board.

This measure permits a correct positioning of the brake power booster in the mounting and/or engine compartment of the motor vehicle.

A considerable simlification of the mounting will be achieved in that the protecting sleeve is provided with a plurality of snap-in projection on its end directed towards the splash-board, said snap-in projections inserting in a radial annular area formed on the adapter.

Further details and advantages of the mounting device according to the present invention will become apparent from the description of two design examples of the invention which will be explained in more details in the following by means of the accompanying drawing, corresponding parts having been marked with like reference numerals.

BRIEF DESCRIPTION OF THE DRAWING

In a schematically simplified illustration, partially in longitudinal cross-section.

DETAILED DESCRIPTION

Figure 1:
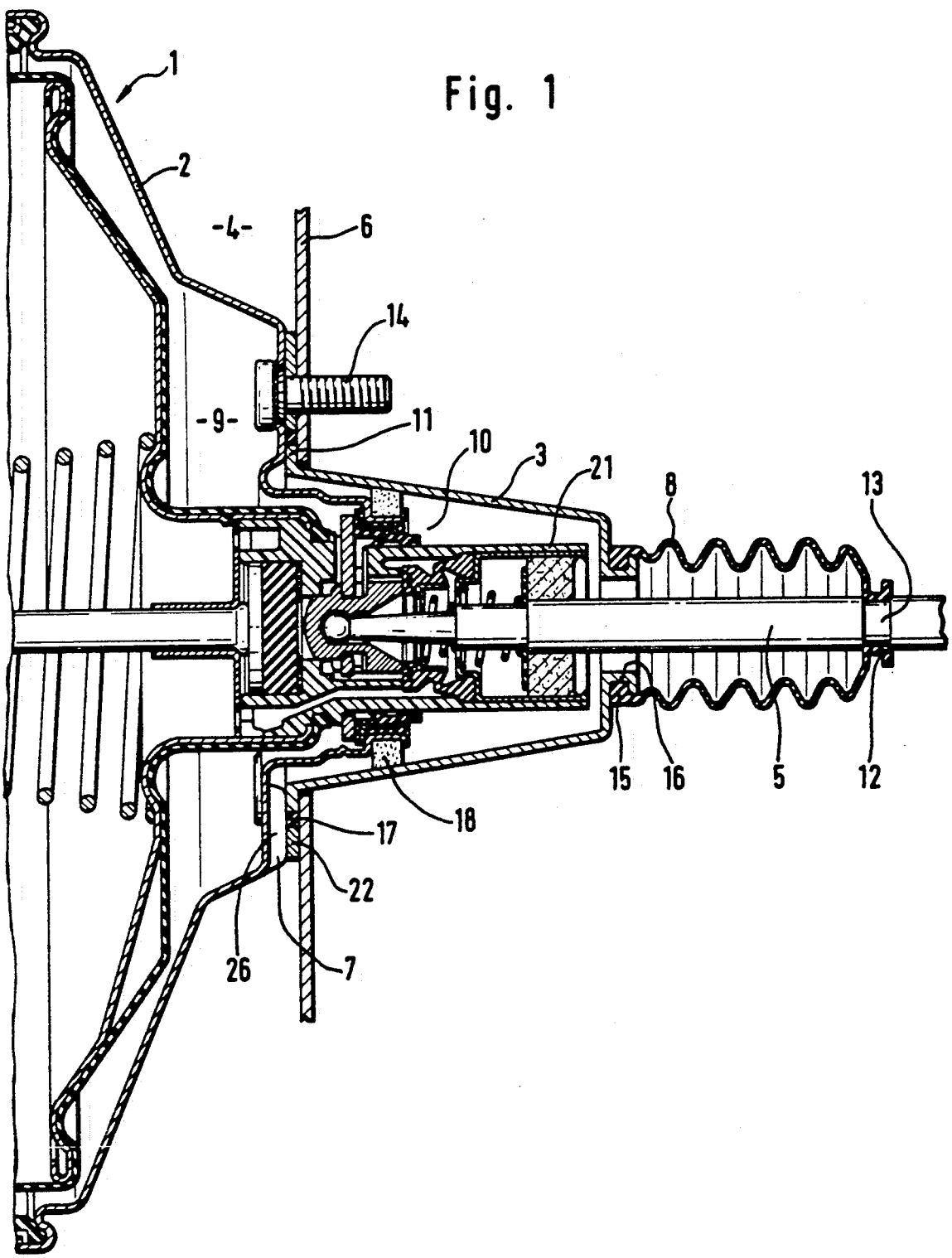
FIG. 1 shows a first design form of the mounting arrangement according to the invention.

In the design form of the invention illustrated in FIG. 1, a brake power booster 1 is mounted to a splash-board 6 in a mounting compartment 4 of a motor vehicle not illustrated in the drawing through the intermediary of a protecting sleeve 3.

For that purpose, the front wall of the booster housing 2 directed towards the splash-board 6 is provided with at least two, preferably four oppositely arranged mounting elements (studs) 14 which project through correspondingly shaped openings in the splash-board 6 and cooperate with screw nuts not illustrated.

The protecting sleeve 3 confining an aeration compartment 10 is provided with a radial collar 11 clamped between the booster housing 2 and the splash-board 6 by using spacers 22. A sealing ring 17 radially abutting on the collar 11 serves to seal the protecting sleeve 3, the aeration compartment 10 commuicating with the mounting and/or engine compartment 4 via an aeration passage 7 which is formed in the present design form by means of beads 26 arranged in the front wall of the booster housing 2.

The end of the protecting sleeve 3 directed away from the booster housing 2 is provided with a radial groove 16 housing an annualar bead 15 of pleated bellows 8 which serve to seal the protecting sleeve 3 relative to an operating rod 5 which, coupled with a brake pedal not illustrated, serves to actuate a control valve preferably accommodated in a control valve housing 21, by means of which control valve a working chamber 9 of the brake power booster 1 is ventilatable and/or evacuatable. The operating rod 5 has a radial groove 13 into which a second annualar bead 12 provided at that end of the pleated bellows 8 which is remote of the protecting sleeve 3 is insertable. Finally, in the aeration compartment 10 a filter element 18 is arranged between a neck portion of the booster housing 2, which neck portion protrudes into the interior of the protecting sleeve 3, and the inner wall of said protecting sleeve, said filter element 18 sealing the interior of the brake power booster 1 against the penetration of dust particles and the like.

Figure 2:
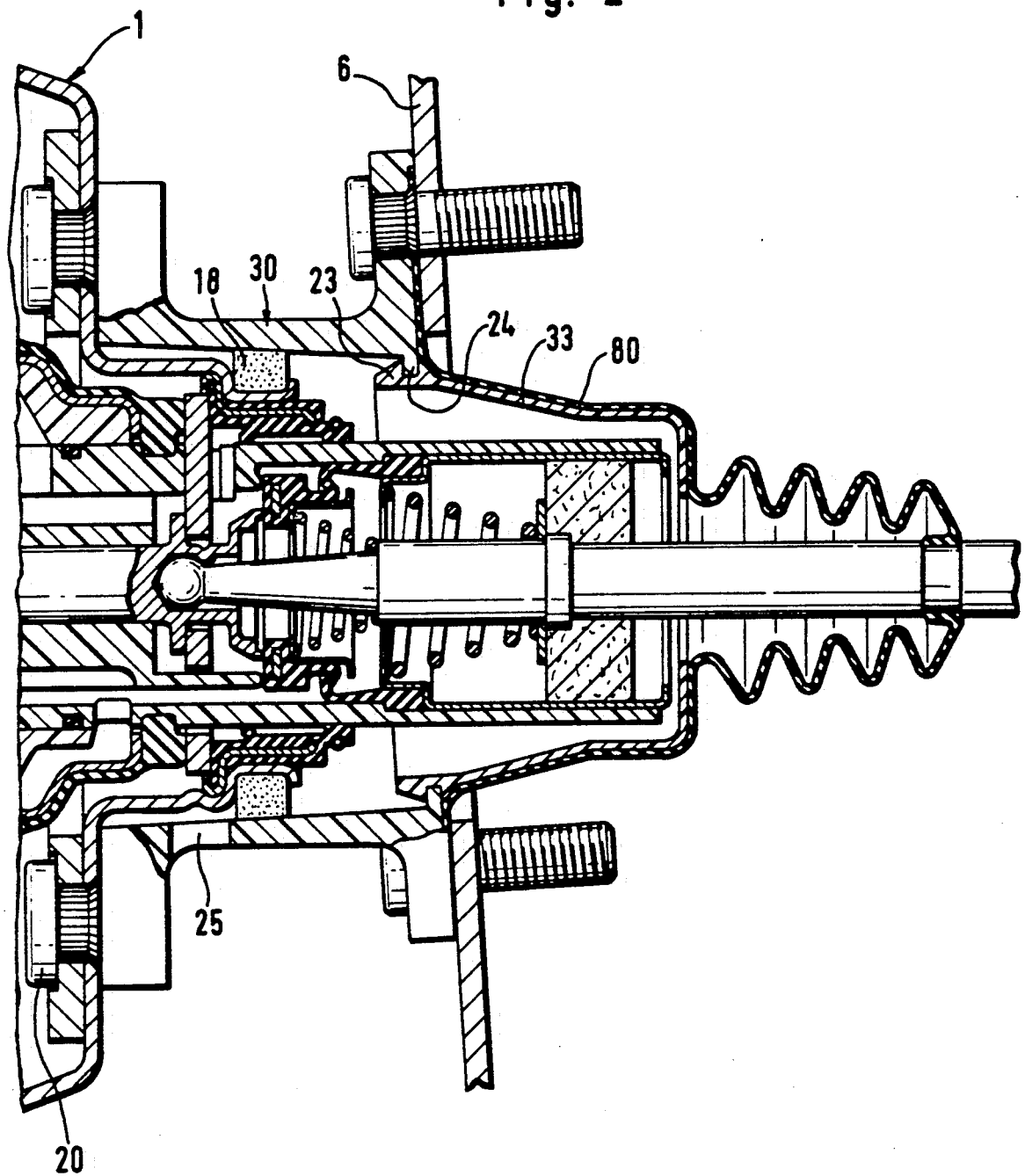
FIG. 2 shows a second design form of the mounting arrangement according to the invention.

In the design form shown in FIG. 2, the brake power booster 1 is mounted to the splash-board 6 through the intermediary of an adapter 30 whose left end, according to the drawing, is screwed to the brake power booster 1 by means of mounting bolts 20. In this design, an aeration passage 7 permitting a quick aeration of the ventilatable working chamber 9 of the brake power booster 1 is formed by means of a radial aeration slit 25 provided in the adapter wall. The protecting sleeve 33 preferably made of a plastic material is connected with the adapter 30 in a form-fit manner through the intermediary of a plurality of snap-in projections 23 which engage into an annular area 24 formed on the adapter 30. The sealing of the protecting sleeve 33 both relative to the splash-board 6 and relative to the operating rod 5 is effected by means of pleated bellows 80 provided at their end adjacent to the adapter 30 with a plurality of mounting areas 19 preferably arranged in a radially oppositely manner, said mounting areas being provided with passage openings, not illustrated in detail, for the mounting elements 14 of the adapter 30. The operating rod 5 mentioned in connection with FIG. 1 passes through the tapered end of the pleated bellows 80, which end is directly away from the adapter 30, the annular bead 12 of the pleated bellows 80 being inserted in the operating rod's radial groove 13. In the annular compartment formed between the inner wall of the adapter 30 and the neck portion of the booster housing 2 the filter element 18 is arranged which serves the above-mentioned purpose.

What is claimed is:

1. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected by way of an aeration compartment (10) communicating with the mounting compartment (4), said aeration compartment being confined by means of a protecting sleeve (3) at least partially surrounding one of the booster housing (2) and a control valve housing (21), said protecting sleeve being sealed both relative to the splash-board (6) and relative to the operating rod (5) wherein said protecting sleeve comprises a plastic material which engages said booster housing in snap-in relationship therewith and wherein said protecting sleeve and said operating rod are surrounded by a flexible bellows and wherein said protecting sleeve (3) is provided with a radial collar (11) clamped between the booster housing and a cooperating member of the motor vehicle and including a sealing ring abutting the collar (11).

2. The apparatus according to claim 1, wherein the protecting sleeve (3) is mounted to an adapter (30) arranged between the booster housing (2) and the splash-board (6).

3. The apparatus according to claim 1, wherein the protecting sleeve (3) is made of a plastic material.

4. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), and wherein the protecting sleeve (3) is provided with a radial collar (11) which is, when installed, clamped between the booster housing (2) and the splash-board (6) of the motor vehicle by using spacers (22), the sealing of the protecting sleeve (3) relative to the splash-board (6) being effected by means of a sealing ring (17) radially abutting on the collar (11).

5. The apparatus according to claim 4, wherein the sealing of the protecting sleeve (3) relative to the operating rod (5) is effected by means of pleated bellows (8) which are provided on at least one end with an annular bead (15) which is insertable into a radial groove (16) formed in the protecting sleeve (3).

6. The apparatus according to claim 4, wherein the sealing of the protecting sleeve (3) relative to the operating rod (5) is effected by means of pleated bellows (8) which are provided on at least one end with an annular bead (12) which is insertable into a radial groove (13) formed in the operating rod (5).

7. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), wherein the protecting sleeve (3) is mounted to an adapter (30) arranged between the booster housing (2) and the splash-board (6), and wherein the protecting sleeve (3, 33) is provided on an end directed towards the splash-board (6) with a plurality of snap-in projections (23) which engage into a radial annular area (24) formed on the adapter (30).

8. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), wherein the protecting sleeve (3) is mounted to an adapter (30) arranged between the booster housing (2) and the splash-board (6), and wherein the sealing of the protecting sleeve (33) relative to the splash-board (6) as well as relative to the operating rod (5) is effected by means of pleated bellows (80) provided with at least two radial mounting areas (19) which are symmetrically oppositely arranged and cooperate with mounting elements (14) formed on the adapter (30).

9. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), wherein the protecting sleeve (3) is mounted to an adapter (30) arranged between the booster housing (2) and the splash-board (6), and wherein the connection of the aeration compartment (10) with the mounting compartment (4) is effected through the intermediary of at least one aeration slit (25) formed in the adapter (30).

10. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), and wherein a filter element (18) is arranged between that part of the booster housing (2) which protrudes into the interior of an adapter (30) and an inner wall of the adapter (30).

11. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), and wherein the connection of the aeration compartment (10) with the mounting compartment (4) is established by means of beads (26) arranged in the booster housing (2) within the area of a radial collar (11).

12. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), and wherein said protecting sleeve (3) at least partially surrounds the booster housing (2) and said control valve housing (21).

13. An apparatus for mounting a brake power booster to a splash-board of a motor vehicle, which brake power booster is actuatable by means of an operating rod and is provided in a booster housing with at least an evacuatable first and a ventilatable second working chamber, said splash-board separating said motor vehicle's passenger compartment from a mounting compartment of the brake power booster, wherein the aeration of the second working chamber (9) is effected via an aeration compartment (10) communicating with the mounting compartment (4), said aeration compartment being confined by means of a protecting sleeve (3) partially surrounding one of the booster housing (2) and a control valve housing (21), said protecting sleeve being sealed both relative to the splash-board (6) and relative to the operating rod (5), and wherein a filter element (18) is arranged between that part of the booster housing (2) which protrudes into the interior of the protecting sleeve (3) and the inner wall of the protecting sleeve (3).

* * * * *